United States Patent
Mi et al.

(10) Patent No.: US 12,376,147 B2
(45) Date of Patent: Jul. 29, 2025

(54) COLLISION HANDLING METHOD AND APPARATUS

(71) Applicant: HUAWEI TECHNOLOGIES CO., LTD., Shenzhen (CN)

(72) Inventors: Xiang Mi, Beijing (CN); Xiaolei Tie, Shanghai (CN); Jun Li, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 470 days.

(21) Appl. No.: 17/672,149

(22) Filed: Feb. 15, 2022

(65) Prior Publication Data
US 2022/0174731 A1  Jun. 2, 2022

Related U.S. Application Data

(63) Continuation of application No. PCT/CN2019/101148, filed on Aug. 16, 2019.

(51) Int. Cl.
*H04W 4/00* (2018.01)
*H04W 74/08* (2009.01)
*H04W 76/28* (2018.01)

(52) U.S. Cl.
CPC .......... *H04W 74/08* (2013.01); *H04W 76/28* (2018.02)

(58) Field of Classification Search
CPC ..... H04W 74/08; H04W 76/28; H04W 68/02; H04L 5/0055; H04L 5/0053
USPC ................................ 370/329, 330
See application file for complete search history.

(56) References Cited

U.S. PATENT DOCUMENTS

| | | |
|---|---|---|
| 2016/0044652 A1 | 2/2016 | Xue et al. |
| 2016/0242162 A1 | 8/2016 | Yao et al. |
| 2017/0013443 A1 | 1/2017 | Gopalakrishnan et al. |
| 2018/0175986 A1 | 6/2018 | Chendamarai Kannan et al. |

(Continued)

FOREIGN PATENT DOCUMENTS

| | | |
|---|---|---|
| EP | 3965487 A1 | 3/2022 |
| GB | 2581173 A | 8/2020 |

OTHER PUBLICATIONS

LG Electronics, Maintenance for wake-up signal in NB-IoT. 3GPP TSG RAN WG1 Meeting #95, Spokane, USA, Nov. 12-16, 2018, R1-1812525, 4 pages.

(Continued)

*Primary Examiner* — Chuong T Ho
(74) *Attorney, Agent, or Firm* — HAUPTMAN HAM, LLP

(57) ABSTRACT

A collision handling method and apparatus are provided. The method includes: a terminal device determines that PUR SS collides with Paging CSS; and the terminal device determines, based on a status of uplink data transmission in PUR associated with the PUR SS and/or a discontinuous reception DRX configuration status of the terminal device, to preferentially monitor the PUR SS or to preferentially monitor the Paging CSS. In the foregoing method, the terminal device determines, based on an actual situation, whether to preferentially monitor the PUR SS or preferentially monitor the paging CSS, so that when the terminal device is to preferentially monitor the PUR SS, the terminal device can receive a feedback of a network device for PUR transmission in time, and when the terminal device i to preferentially monitor the Paging CSS, it can be ensured that the terminal device can receive a paging message in time.

16 Claims, 7 Drawing Sheets

(56) References Cited

U.S. PATENT DOCUMENTS

| | | | |
|---|---|---|---|
| 2021/0274526 A1* | 9/2021 | Shin | H04L 1/1896 |
| 2021/0314925 A1* | 10/2021 | Shin | H04L 5/0053 |
| 2021/0321413 A1* | 10/2021 | Shin | H04W 56/0045 |
| 2022/0038997 A1* | 2/2022 | Höglund | H04W 48/06 |
| 2022/0217677 A1* | 7/2022 | Takeda | H04L 5/0094 |
| 2022/0225357 A1* | 7/2022 | Yan | H04W 68/005 |

OTHER PUBLICATIONS

ZTE, Support for transmission in preconfigured UL resources for MTC. 3GPP TSG RAN WG1 Meeting #96bis, Xi"an, China, Apr. 8-12, 2019, R1-1904343, 12 pages.

Extended European Search Report issued in corresponding European Application No. 19942302.1, mailed Nov. 17, 2022, pp. 1-14.

Ericsson, PUR with DCI scheduling. 3GPP TSG-RAN WG2 #106, Reno, Nevada, USA, May 13-17, 2019, R2-1907551, 5 pages.

Sequans Communications, DRX considerations for preconfigured resources. 3GPP TSG-RAN WG2 Meeting #106, Prague, Czech Republic,Aug. 26-30, 2019, R2-1910237, 4 pages.

Huawei, HiSilicon, Feature lead summary of Support for transmission in preconfigured UL resources. 3GPP TSG RAN WG1 Meeting #96bis, Xi'an, China, Apr. 8-12, 2019, R1-1905538, 27 pages.

Ericsson, Huawei, New WID on Rel-16 enhancements for NB-IoT. 3GPP TSG RAN Meeting #80, La Jolla, USA, Jun. 11-14, 2018, RP-181451, 4 pages.

3GPP TS 36.213 V15.6.0 (Jun. 2019), 3rd Generation Partnership Project; Technical Specification Group Radio Access Network; Evolved Universal Terrestrial Radio Access (E-UTRA); Physical layer procedures(Release 15), 551 pages.

Sierra Wireless, LTE-M Pre-configured UL Resources Design Considerations. 3GPP TSG RAN WG1 Meeting #97, Reno, USA, May 13-17, 2019, R1-1906460, 12 pages.

ZTE, Support for transmission in preconfigured UL resources for MTC. 3GPP TSG RAN WG1 Meeting #97, Reno, USA, May 13-17, 2019, R1-1906496, 13 pages.

International Search Report issued in corresponding International Application No. PCT/CN2019/101148, dated May 18, 2020, pp. 1-14.

India Examination Report issued in corresponding India Application No. 202227009154, dated Jul. 27, 2022, pp. 1-6.

3GPP TSG-RAN WG2 #107 R2-1910436,"General PUR Procedure", Ericsson, prague, Czech Republic, Aug. 26-30, 2019, total 16 pages,XP051768215.

European Office Action issued in corresponding European Application No. 19942302.1, dated Apr. 2, 2025, pp. 1-8.

\* cited by examiner

Paging common search space

COLLISION HANDLING METHOD AND APPARATUS

CROSS-REFERENCE TO RELATED APPLICATIONS

This application is a continuation of International Application No. PCT/CN2019/101148, filed on Aug. 16, 2019, the disclosure of which is hereby incorporated by reference in its entirety.

TECHNICAL FIELD

This application relates to the field of wireless communications technologies, and in particular, to a collision handling method and apparatus.

BACKGROUND

In a wireless communications system, a terminal device has two modes. One is a connected mode, which indicates that the terminal device has established a connection to a network device and can directly perform communication; and the other one is an idle mode, or referred to as a sleep mode, which indicates that the terminal device cannot directly communicate with the network device. To ensure that the network device can effectively find a terminal device in the idle mode, the network device usually uses a paging method, that is, periodically sends a paging signal to the terminal device, to indicate whether the terminal device is to switch from the idle mode to the connected mode to communicate with the network device. When there is no service to be sent or received, the terminal device may enter the idle mode to reduce power consumption. For the terminal device in the idle mode, when the network device is to send service data to the terminal device, the network device may notify the terminal device by using a paging mechanism. After receiving a paging notification, the terminal device may enter the connected mode, to receive the service data.

As shown in FIG. 1, in the current technology, the terminal device in the idle mode periodically wakes up to monitor a paging message to check whether there is a paging indication for the terminal device. A periodic wake-up cycle is referred to as a discontinuous reception (discontinuous reception, DRX) cycle, and the DRX cycle may be indicated by a system message. A location at which the terminal device wakes up is referred to as a paging occasion (paging occasion, PO). The terminal device first detects, on the PO, whether a narrowband physical downlink control channel (narrowband physical downlink control channel, NPDCCH) exists in paging common search space (paging common search space, Paging CSS). If the NPDCCH is detected in the Paging CSS, the terminal device receives a narrow physical downlink shared channel (narrow physical downlink shared channel, NPDSCH) based on indication information carried on the detected NPDCCH; or if the NPDCCH is not detected in the Paging CSS, the terminal device does not receive the NPDSCH. For the terminal device in the idle mode, the terminal device sleeps most of the time in the DRX cycle, and only wakes up on a corresponding PO to monitor the NPDCCH. The terminal device is to detect only one PO in the DRX cycle.

Currently, to improve data transmission efficiency, an uplink grant-free transmission technology is proposed. In the uplink grant-free transmission technology, the network device preconfigures uplink grant-free resources for the terminal device. These resources may be referred to as preconfigured uplink resources (preconfigured UpLink resources, PUR). When the terminal device is to transmit uplink data, the terminal device directly performs uplink data transmission in the PUR in a preset sending manner. As shown in FIG. 2, after performing uplink transmission in the PUR, the terminal device monitors PUR search space (PUR search space, PUR SS) for a period of time, and the period of time of monitoring is referred to as a PUR SS window (window). After demodulating the uplink data on the PUR, the network device may send downlink control information (downlink control information, DCI) to the terminal device in the PUR SS.

However, the currently discussed PUR are mainly for the terminal device in the idle mode. Therefore, if the PUR SS collides with the Paging CSS, how the terminal device handles the collision is not provided with a solution.

SUMMARY

An objective of implementations of this application is to provide a collision handling method and apparatus, to resolve a problem of how a terminal device handles a collision when PUR SS collides with Paging CSS.

According to a first aspect, an embodiment of this application provides a collision handling method. The method includes: A terminal device determines that preconfigured uplink resources search space PUR SS collides with paging common search space Paging CSS; and the terminal device determines, based on a status of uplink data transmission in PUR associated with the PUR SS and/or a discontinuous reception DRX configuration status of the terminal device, to preferentially monitor the PUR SS or to preferentially monitor the Paging CSS.

In the foregoing method procedure, when the terminal device determines, based on an actual situation, that the terminal device is to preferentially monitor the PUR SS, the terminal device can receive a feedback of a network device for PUR transmission in time; and when the terminal device determines, based on the actual situation, that the terminal device is to preferentially monitor the Paging CSS, it can be ensured that the terminal device can receive a paging message in time, thereby reducing a paging delay.

In a possible design, that the terminal device determines, based on a status of uplink data transmission in PUR associated with the PUR SS and a discontinuous reception DRX configuration status of the terminal device, to preferentially monitor the PUR SS includes: The terminal device preferentially monitors the PUR SS when the terminal device has performed uplink data transmission in the PUR and the terminal device is a discontinuous reception DRX terminal device.

In a possible design, that the terminal device determines, based on a status of uplink data transmission in PUR associated with the PUR SS and/or a discontinuous reception DRX configuration status of the terminal device, to preferentially monitor the Paging CSS includes: The terminal device preferentially monitors the Paging CSS when the terminal device does not perform uplink data transmission in the PUR, or when the terminal device has performed uplink data transmission in the PUR and the terminal device is an extended discontinuous reception eDRX terminal device.

According to a second aspect, an embodiment of this application provides a collision handling method. The method includes: A network device determines that preconfigured uplink resources search space PUR SS collides with paging common search space Paging CSS; and the network device determines, based on a status of uplink data transmission in PUR associated with the PUR SS and/or a discontinuous reception DRX configuration status of a terminal device, to preferentially send, in the PUR SS, feedback information of uplink data, or to preferentially send, in the Paging CSS, paging indication information used to page the terminal device.

In the foregoing method procedure, when the terminal device determines, based on an actual situation, that the terminal device is to preferentially monitor the PUR SS, the terminal device can receive a feedback of the network device for PUR transmission in time; and when the terminal device determines, based on the actual situation, that the terminal device is to preferentially monitor the Paging CSS, it can be ensured that the terminal device can receive a paging message in time, thereby reducing a paging delay.

In a possible design, that the network device determines, based on a status of uplink data transmission in PUR associated with the PUR SS and/or a discontinuous reception DRX configuration status of a terminal device, to preferentially send, in the PUR SS, feedback information of uplink data includes: when uplink data from the terminal device is received in the PUR, and the terminal device is a discontinuous reception DRX terminal device, preferentially sending, in the PUR SS, the feedback information of the uplink data.

In a possible design, that the network device determines, based on a status of uplink data transmission in PUR associated with the PUR SS and/or a discontinuous reception DRX configuration status of a terminal device, to preferentially send, in the Paging CSS, paging indication information used to page the terminal device includes: when the uplink data from the terminal device is not received in the PUR, or when the uplink data from the terminal device is received in the PUR, and the terminal device is an extended discontinuous reception eDRX terminal device, preferentially sending, in the Paging CSS, the paging indication information used to page the terminal device.

According to a third aspect, an embodiment of this application provides a collision handling method. The method includes: A terminal device determines that preconfigured uplink resources PUR collide with paging common search space Paging CSS; and the terminal device preferentially monitors the Paging CSS.

In this method, the terminal device preferentially monitors the Paging CSS, so that it can be ensured that the terminal device can detect, in the Paging CSS, paging indication information in time, to receive a paging message in time, thereby reducing a paging delay (paging delay).

In a possible design, the method further includes: The terminal device receives first indication information from a network device, where the first indication information is used to indicate the terminal device to preferentially monitor the Paging CSS.

According to a fourth aspect, an embodiment of this application provides a collision handling method. The method includes: A network device determines that preconfigured uplink resources PUR collide with paging common search space Paging CSS; and the network device determines to preferentially send, in the Paging CSS, paging indication information used to page a terminal device.

In this method, the network device preferentially sends, in the Paging CSS, the paging indication information used to page the terminal device, so that it can be ensured that the terminal device can detect, in the Paging CSS, the paging indication information in time, to receive a paging message in time, thereby reducing a paging delay (paging delay).

In a possible design, the method further includes: The network device sends first indication information to the terminal device, where the first indication information is used to indicate the terminal device to preferentially monitor the Paging CSS.

According to a fifth aspect, an embodiment of this application provides a collision handling method. The method includes: A terminal device determines that preconfigured uplink resources PUR or preconfigured uplink resources search space PUR SS collides with a WUS; and the terminal device preferentially transmits uplink data in the PUR, or preferentially monitors the PUR SS.

In a possible design, the method further includes: The terminal device receives second indication information from a network device, where the second indication information is used to indicate the terminal device to preferentially transmit the uplink data in the PUR, or preferentially monitor the PUR SS.

According to a sixth aspect, an embodiment of this application provides a collision handling method. The method includes: A network device determines that preconfigured uplink resources PUR or preconfigured uplink resources search space PUR SS collides with a WUS; and the network device preferentially receives, in the PUR, uplink data from a terminal device, or preferentially sends, in the PUR SS, feedback information of the uplink data.

In the foregoing method procedure, when the PUR collide with the WUS, the terminal device preferentially transmits the uplink data in the PUR, to avoid a waste of the PUR, thereby improving resource utilization. When the PUR SS collides with the WUS, the terminal device preferentially monitors the PUR SS, to ensure that the terminal device may receive the feedback information of the network device for the uplink data in the PUR associated with the PUR SS, thereby improving data transmission efficiency.

In a possible design, the method further includes: The network device sends second indication information to the terminal device, where the second indication information is used to indicate the terminal device to preferentially transmit the uplink data in the PUR, or preferentially monitor the PUR SS.

According to a seventh aspect, an embodiment of this application provides a collision handling method. The method includes: A terminal device determines that PUR or PUR SS collides with a wake-up signal WUS; and the terminal device preferentially receives the WUS.

In the foregoing method procedure, when the PUR collide with the WUS, the terminal device preferentially transmits the uplink data in the PUR, to avoid a waste of the PUR, thereby improving resource utilization. When the PUR SS collides with the WUS, the terminal device preferentially monitors the PUR SS, to ensure that the terminal device can receive feedback information of a network device for the uplink data in the PUR associated with the PUR SS, thereby improving data transmission efficiency.

In a possible design, the method further includes: The terminal device receives third indication information from the network device, where the third indication information is used to indicate the terminal device to preferentially receive the WUS.

According to an eighth aspect, an embodiment of this application provides a collision handling method. The method includes: A network device determines that PUR or PUR SS collides with a wake-up signal WUS; and the network device preferentially sends the WUS to a terminal device.

In a possible design, the method further includes: The network device sends third indication information to the terminal device, where the third indication information is used to indicate the terminal device to preferentially receive the WUS.

According to a ninth aspect, an embodiment of this application provides a collision handling method. The method includes: A terminal device determines that preconfigured uplink resources search space PUR SS collides with a wake-up signal WUS; and the terminal device does not use PUR associated with the PUR SS to transmit uplink data.

This method is simple and flexible to implement, and may further avoid a collision between the PUR SS and the WUS.

According to a tenth aspect, an embodiment of this application provides a communications apparatus. The communications apparatus includes a processor, and the processor is coupled to a memory. The memory is configured to store instructions. The processor is configured to perform the method according to any one of the foregoing aspects or the possible designs of the foregoing aspects according to the instructions stored in the memory. Optionally, the communications apparatus may further include the memory. Optionally, the communications apparatus may further include a transceiver, configured to support the communications apparatus in sending and/or receiving information in the foregoing method. Optionally, the communications apparatus may be a terminal device or a network device, or may be an apparatus, for example, a chip or a chip system, in the terminal device or the network device. The chip system includes at least one chip, and the chip system may further include another circuit structure and/or discrete device.

According to an eleventh aspect, an embodiment of this application further provides a communications apparatus, configured to implement any method according to any one of the foregoing aspects or the possible designs of the foregoing aspects. The communications apparatus includes corresponding functional modules, such as a processing unit and a communications unit, which are respectively configured to implement the steps in the foregoing method.

According to a twelfth aspect, an embodiment of this application provides a computer-readable storage medium. The computer storage medium stores computer-readable instructions. When a computer reads and executes the computer-readable instructions, a communications apparatus is enabled to perform the method according to any one of the foregoing possible designs.

According to a thirteenth aspect, an embodiment of this application provides a computer program product. When a computer reads and executes the computer program product, the communications apparatus is enabled to perform the method according to any one of the foregoing possible designs.

According to a fourteenth aspect, an embodiment of this application provides a chip. The chip is connected to a memory, and is configured to read and execute a software program stored in the memory, to implement the method according to any one of the foregoing possible designs.

DESCRIPTION OF EMBODIMENTS

The following further describes in detail embodiments of this application with reference to the accompanying drawings.

The embodiments of this application may be applied to various mobile communications systems, for example, a new radio (new radio, NR) system, a long term evolution (long term evolution, LTE) system, an advanced long term evolution (advanced long term evolution, LTE-A) system, and another communications system. This is not limited herein.

Figure 1:
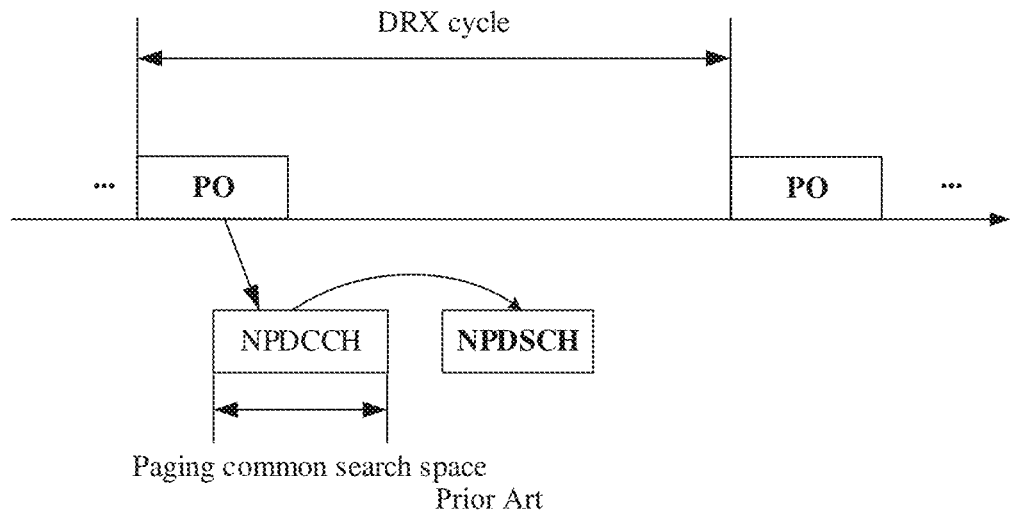
FIG. 1 is a schematic diagram of a PO location in the current technology.
Figure 2:
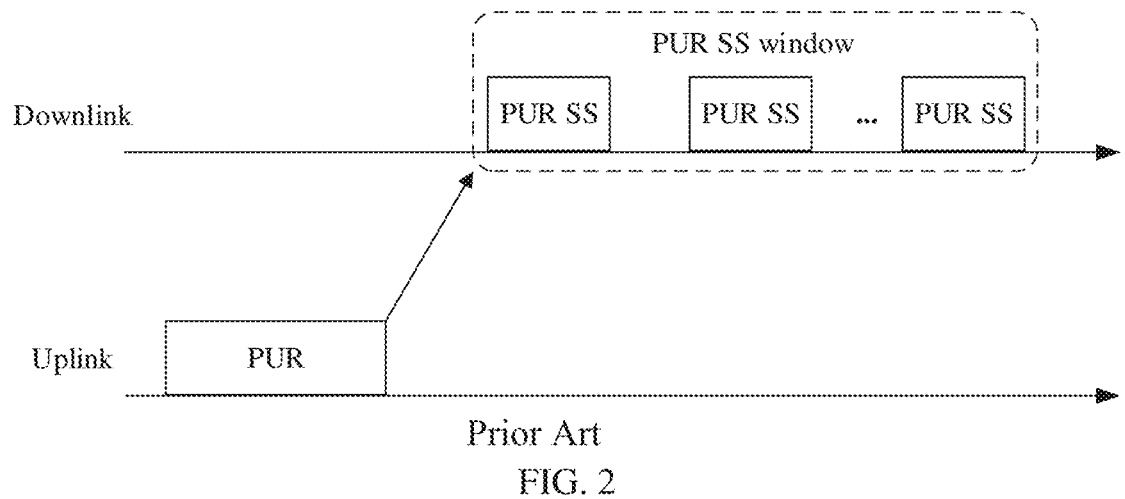
FIG. 2 is a schematic diagram of PUR SS in the current technology.
Figure 3:
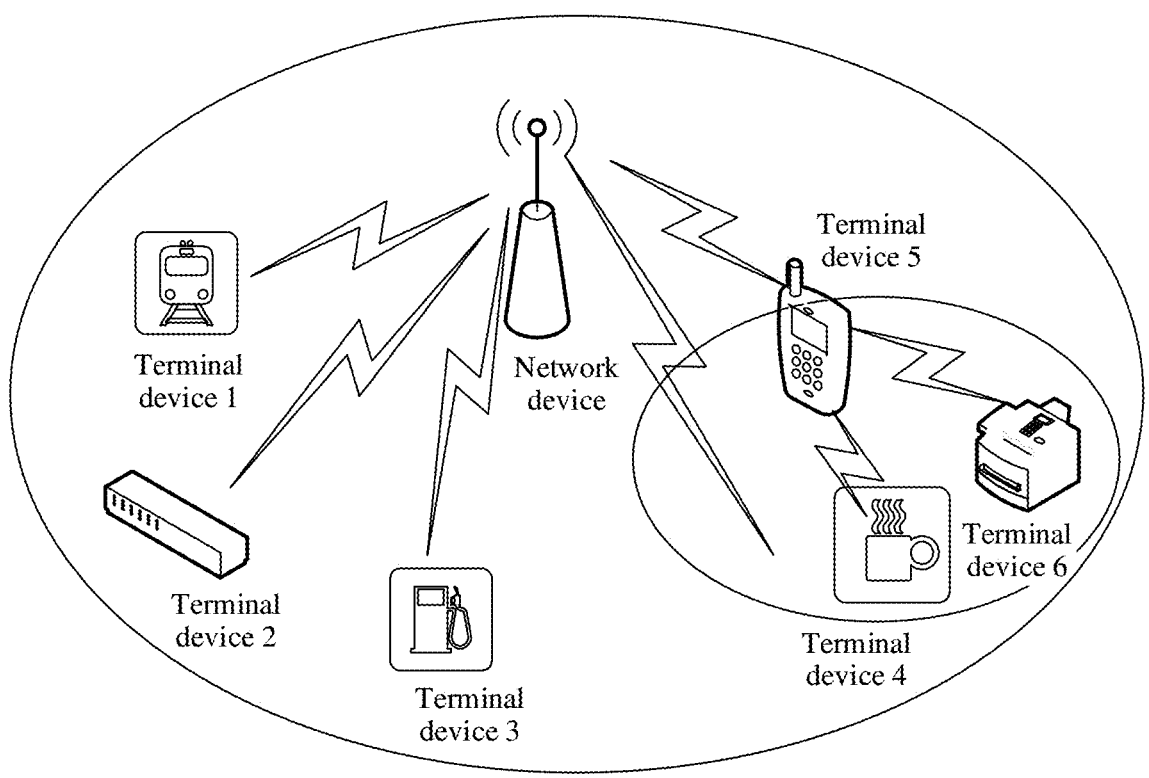
FIG. 3 is a schematic diagram of a communications system architecture applicable to embodiments of this application.

For ease of understanding the embodiments of this application, a communications system shown in FIG. 3 is first used as an example to describe in detail a communications system applicable to the embodiments of this application. FIG. 3 is a schematic diagram of the communications system applicable to the embodiments of this application. As shown in FIG. 3, a network device and a terminal device 1 to a terminal device 6 form a communications system. In the communications system, the terminal device 1 to the terminal device 6 may send uplink data to the network device, and the network device may send downlink data to the terminal device 1 to the terminal device 6. In addition, the terminal device 4 to the terminal device 6 may form a communications system. In this communications system, the network device may send, to the terminal device 5, downlink data to be sent to the terminal device 4 and the terminal device 6, and then the terminal device 5 forwards the downlink data to the terminal device 4 and the terminal device 6.

Specifically, a terminal device in the embodiments of this application is a device that provides a voice and/or data connectivity for a user and that has a wireless transceiver function, or a chip that can be disposed in the device. The terminal device may communicate with one or more core networks through a radio access network (radio access network, RAN). The terminal device may be a mobile phone (mobile phone), a tablet (Pad), a computer having a wireless transceiver function, a personal digital assistant (personal digital assistant, PDA), a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing terminal device and a chip that may be disposed in the terminal device are collectively referred to as a terminal device. The terminal device in the embodiments of this application may also be referred to as user equipment (user equipment, UE), a user terminal (user terminal), an access terminal (access terminal), a subscriber unit, a subscriber station, a mobile station (mobile station), a mobile (mobile), a remote station (remote station), a remote terminal (remote terminal), a mobile device, a wireless communications device, a user agent, or a user apparatus.

The network device is a device having a wireless transceiver function or a chip that can be disposed in the device. The network device may be configured to perform mutual conversion between a received over-the-air frame and an IP packet, and serve as a router between the terminal device and a remaining portion of an access network. The network device may be further configured to coordinate attribute management on an air interface. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission reception point, TRP or transmission point, TP), or the like. The device may further be a gNB or a transmission point (TRP or TP) in a 5G (NR) system, or may be an antenna panel or a group of antenna panels (including a plurality of antenna panels) of a base station in the 5G system.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

Some scenarios in the embodiments of this application are described by using a scenario of a narrowband Internet of Things (narrow band internet of things, NB-IoT) as an example. It should be noted that the solutions in the embodiments of this application may be further applied to another scenario, for example, may also be applied to an enhanced Machine-Type Communication (enhanced Machine-Type Communication, eMTC) scenario and a Device to Device (Device to Device, D2D) scenario. Corresponding names may also be replaced with names of corresponding functions in another wireless communications network. Examples are not described one by one herein.

Embodiment 1

Figure 4:
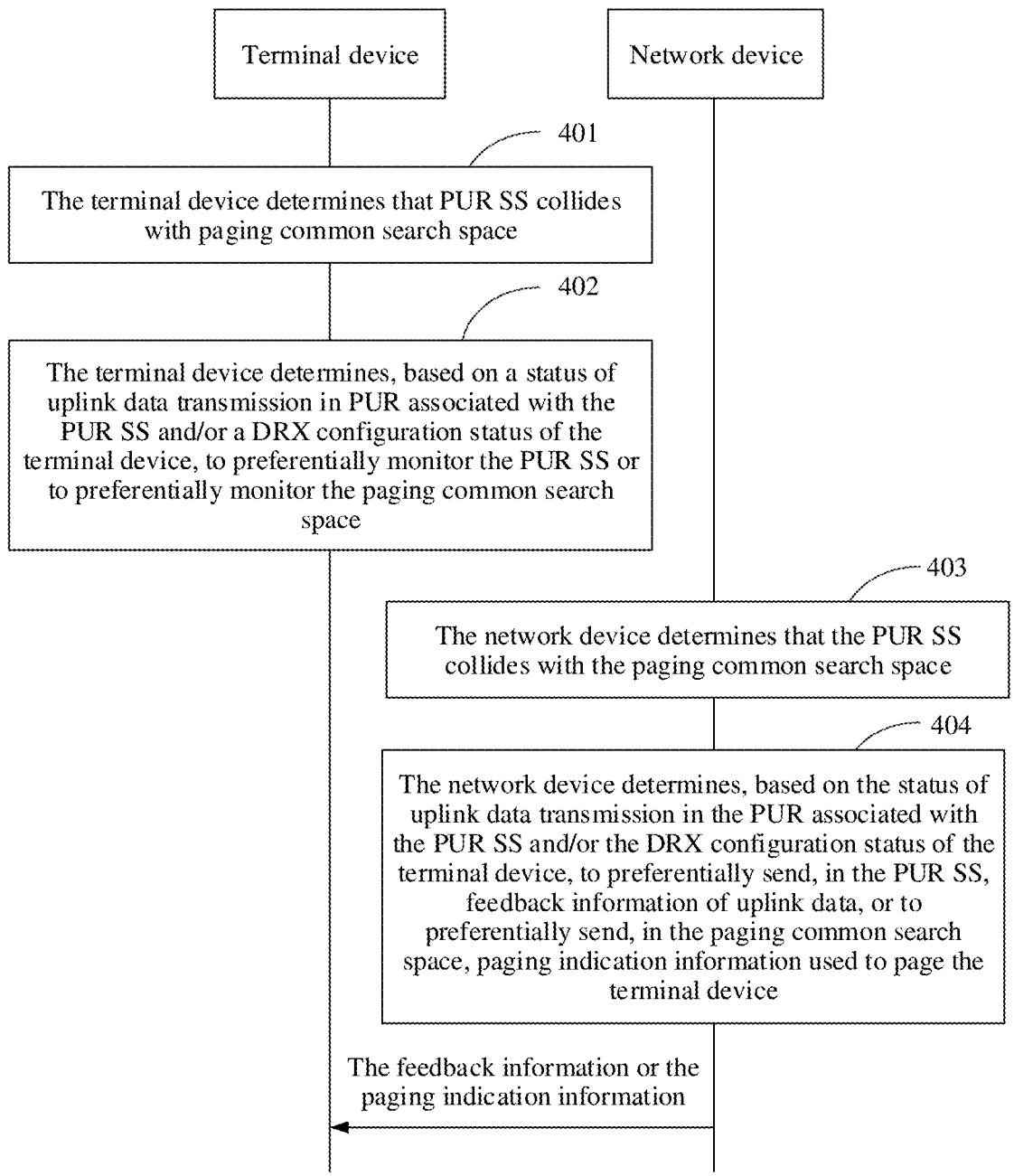
FIG. 4 is a schematic flowchart of a collision handling method according to an embodiment of this application.

With reference to the foregoing descriptions, FIG. 4 is a schematic flowchart of a collision handling method according to an embodiment of this application. Refer to FIG. 4. The method includes the following steps.

Step 401: A terminal device determines that PUR SS collides with paging common search space.

As described above, PUR are preconfigured uplink resources for a network device, and the PUR are associated with the PUR SS. When transmitting uplink data in the PUR, the terminal device may monitor the PUR SS, to receive information such as downlink control information (downlink control information, DCI) fed back by the network device.

Correspondingly, the terminal device may determine, by monitoring the Paging CSS, whether an NPDSCH sent by the network device exists in the Paging CSS. In all embodiments of this application, the Paging CSS may also be referred to as Type-1 CSS or the like, which is not repeated subsequently.

When determining that the PUR SS and the Paging CSS overlap in time domain, the terminal device may determine that the PUR SS collides with the Paging CSS. The overlapping described herein may refer to partial overlapping or full overlapping.

Figure 5:
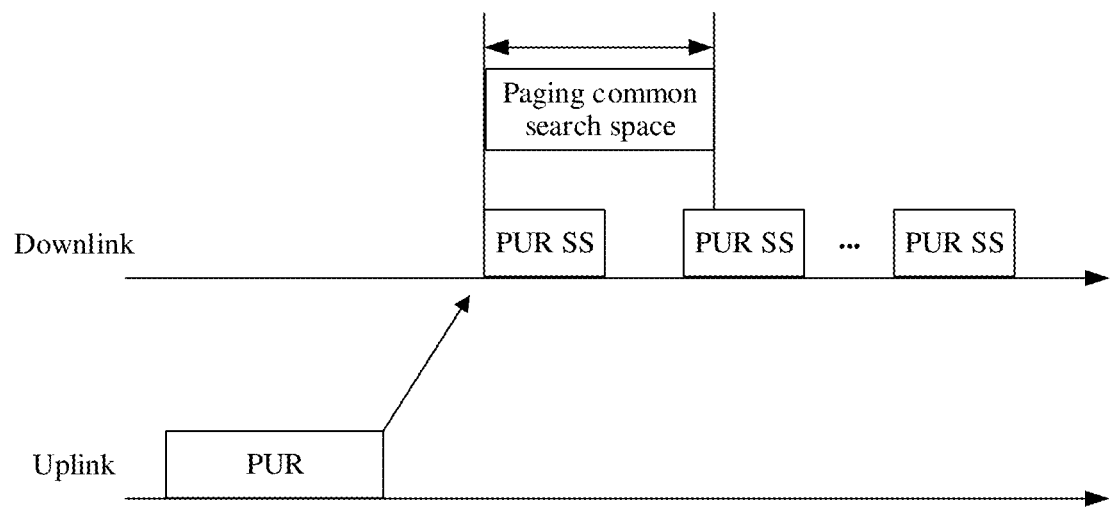
FIG. 5 is a schematic diagram of a collision between PUR SS and Paging CSS according to an embodiment of this application.

For example, as shown in FIG. 5, FIG. 5 is a schematic diagram of a collision between the PUR SS and the Paging CSS. Because the terminal device can monitor only one of the search spaces at a time, when the PUR SS collides with the Paging CSS, the terminal device is to determine which search space is to be preferentially monitored.

Step 402: The terminal device determines, based on a status of uplink data transmission in the PUR associated with the PUR SS and/or a DRX configuration status of the terminal device, to preferentially monitor the PUR SS or to preferentially monitor the paging common search space.

It should be noted that, when the terminal device preferentially monitors the PUR SS, the terminal device may not need to monitor the Paging CSS.

Step 403: The network device determines that the PUR SS collides with the paging common search space.

Step 404: The network device determines, based on the status of uplink data transmission in the PUR associated with the PUR SS and/or the DRX configuration status of the terminal device, to preferentially send, in the PUR SS, feedback information of uplink data, or to preferentially send, in the paging common search space, paging indication information used to page the terminal device.

It should be noted that the paging indication information herein may be DCI in an NPDCCH, and the DCI is used to schedule an NPDSCH including a paging message.

In the foregoing method procedure, when the terminal device determines, based on the uplink data transmission status and/or a discontinuous reception DRX type of the terminal device, that the terminal device is to preferentially monitor the PUR SS, the terminal device can receive a feedback of the network device for PUR transmission in time. When the terminal device determines, based on the uplink data transmission status and/or the discontinuous reception DRX type of the terminal device, that the terminal device is to preferentially monitor the Paging CSS, it can be ensured that the terminal device can receive the paging message in time, thereby reducing a paging delay. Correspondingly, the network device determines, by using the same method, whether to preferentially send, in the PUR SS, the feedback information of the uplink data or to preferentially send the paging indication information in the Paging CSS. In this way, when the terminal device is to preferentially monitor the PUR SS, the terminal device can receive the feedback of the network device for the PUR transmission in time, and when the terminal device is to preferentially monitor the Paging CSS, it can be ensured that the terminal device can receive the paging message in time, thereby reducing the paging delay.

It should be noted that the DRX configuration status of the terminal device may be classified into a DRX terminal device and an extended discontinuous reception (extended Discontinuous Reception, eDRX) terminal device. The terminal device being the DRX terminal device means that the terminal device has no eDRX configuration (a UE without eDRX configuration). The terminal device being the eDRX terminal device means that the terminal device has eDRX configuration (a UE with eDRX configuration), or may mean that the terminal device supports extended idle mode DRX (a UE which supports extended idle mode DRX), or may mean that the terminal device indicates support of extended idle mode DRX (a UE indicating support of extended idle mode DRX).

The DRX terminal device has the following characteristics:

The terminal device is in a light sleep (light sleep) mode when the terminal device is not on a PO, and most circuits may be shut down, to reduce power consumption. The terminal device periodically wakes up to detect the PO. The periodicity is referred to as a DRX cycle (cycle). For example, a value of the DRX cycle may be any one of the following values: 1.28 seconds, 2.56 seconds, 5.12 seconds, or 10.24 seconds. It can be learned that, because a maximum DRX cycle is 10.24 seconds, the DRX terminal device is to wake up once at least 10.24 seconds.

Figure 6:
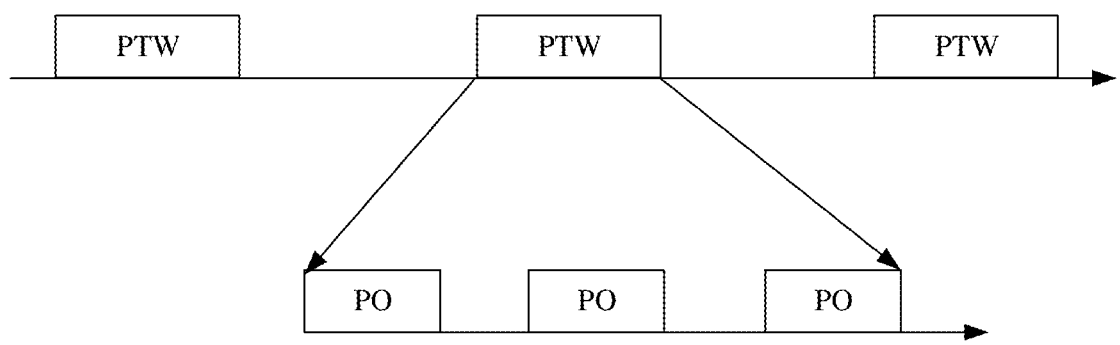
FIG. 6 is a schematic diagram of a paging transmission window according to an embodiment of this application.

The eDRX terminal device consumes less power than the DRX terminal device, and the eDRX terminal device has the following characteristics:

As shown in FIG. 6, the eDRX terminal device has a paging transmission window (paging transmission window, PTW) in time domain, and the terminal device is in a deep sleep (deep sleep) mode outside the PTW. More circuits may shut down and more power may be saved in the deep sleep mode than in the light sleep mode. The eDRX terminal device wakes up only inside the PTW. A behavior of the eDRX terminal device inside the PTW is the same as that of the DRX terminal device. A maximum PTW cycle is 2.9 hours, which means that the eDRX terminal device may wake up once every 2.9 hours.

In Step 402, whether the terminal device preferentially monitors the PUR SS or preferentially monitors the Paging CSS may be specifically determined in different manners, which is described in the following with reference to different scenarios.

Scenario 1: When the terminal device has performed uplink data transmission in the PUR associated with the PUR SS, and the terminal device is the DRX terminal device, the terminal device may preferentially monitor the PUR SS.

It should be noted that, in the current technology, the terminal device monitors the PUR SS in two cases:

1. Case 1: The terminal device has performed uplink data transmission in the PUR, and therefore is to monitor the PUR SS.

Correspondingly, if the terminal device currently has no data to send, the terminal device does not perform uplink data transmission in the PUR, and therefore does not need to monitor the PUR SS.

2. Case 2: The terminal device does not perform uplink data transmission in the PUR, but the terminal device is to periodically monitor the PUR SS to receive an indication (for example, PUR update or release) of the network device.

Therefore, with reference to the foregoing description, when the terminal device has performed uplink data transmission in the PUR associated with the PUR SS, after the network device receives the uplink data, the network device interacts with a core network device. In this case, the core network device may determine that the terminal device is in a connected mode and does not send a paging message to the terminal device. Therefore, in this scenario, it is appropriate that the terminal device preferentially monitors the PUR SS, instead of the Paging CSS, and the receiving of the paging message by the terminal device is not affected. In addition, because the terminal device does not need to switch monitored search space, complexity of the terminal device can be reduced, and the power consumption of the terminal device can be reduced.

Scenario 2: When the terminal device has performed uplink data transmission in the PUR associated with the PUR SS, and the terminal device is the eDRX terminal device, the terminal device preferentially monitors the Paging CSS.

Scenario 3: When the terminal device does not perform uplink data transmission in the PUR, and the terminal device is the eDRX terminal device, the terminal device preferentially monitors the Paging CSS.

In Scenario 2 and Scenario 3, with reference to the foregoing description, it can be learned that, because the maximum PTW cycle is 2.9 hours, it means that if the terminal device misses one paging, a next paging may start after 2.9 hours. Therefore, the terminal device preferentially monitors the Paging CSS, so that it can be ensured that the terminal device can receive the paging message in time, thereby reducing the paging delay.

Further, there may be Scenario 4: When the terminal device has performed uplink data transmission in the PUR associated with the PUR SS, the terminal device is the DRX terminal device, and the DRX cycle is less than a preset threshold, the terminal device may preferentially monitor the PUR SS. The threshold may be configured by the network device, or agreed upon in advance (for example, stipulated in a protocol). Otherwise, the terminal device preferentially monitors the Paging CSS.

Correspondingly, in Step 404, whether the network device preferentially sends, in the PUR SS, the feedback information of the uplink data, or preferentially sends the paging indication information in the Paging CSS may be specifically determined in different manners, which is described in the following with reference to different scenarios.

Scenario 1: When the network device receives, in the PUR associated with the PUR SS, the uplink data from the terminal device, and the terminal device is the DRX terminal device, the network device may preferentially send, in the PUR SS, the feedback information of the uplink data.

Scenario 2: When the network device receives, in the PUR associated with the PUR SS, the uplink data from the terminal device, and the terminal device is the eDRX terminal device, the network device preferentially sends, in the Paging CSS, the paging indication information.

Scenario 3: When the network device does not receive, in the PUR associated with the PUR SS, the uplink data from the terminal device, and the terminal device is the eDRX terminal device, the network device preferentially sends the paging indication information in the Paging CSS.

For details about the foregoing content, refer to the foregoing description. Details are not described herein again.

Embodiment 2

The foregoing describes a scenario of a collision between PUR SS and Paging CSS. An embodiment of this application further provides a method, which may be applied to a scenario of a collision between PUR and Paging CSS. Details are described below.

Figure 7:
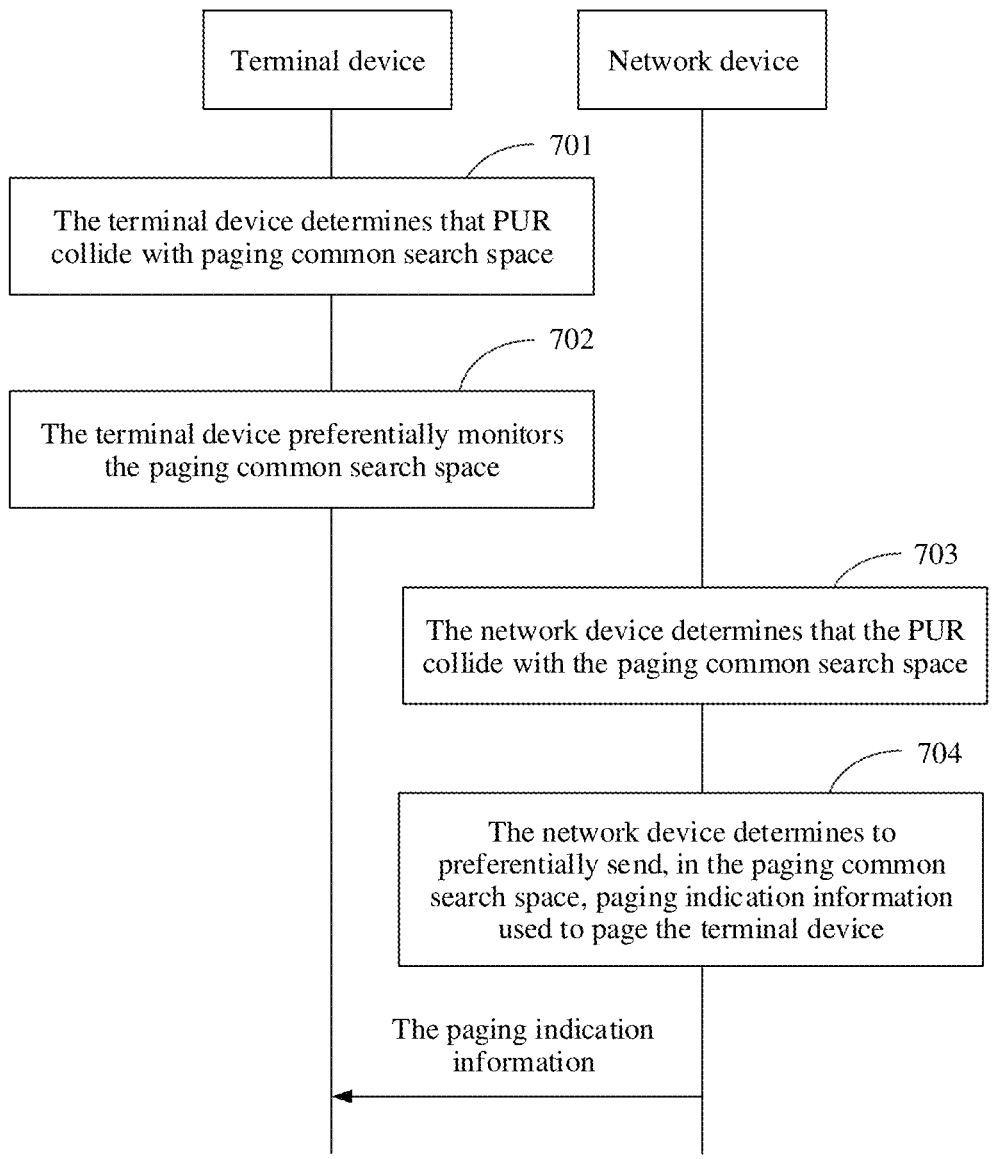
FIG. 7 is a schematic flowchart of a collision handling method according to an embodiment of this application.

FIG. 7 is a schematic flowchart of a collision handling method according to the embodiment of this application. Refer to FIG. 7. The method includes the following steps.

Step 701: A terminal device determines that PUR collide with paging common search space.

It should be noted that the collision between the PUR and the Paging CSS may mean that the PUR and the Paging CSS overlap in time domain. The overlapping described herein may be partial overlapping or full overlapping.

Step 702: The terminal device preferentially monitors the paging common search space.

It should be noted that, when the terminal device preferentially monitors the Paging CSS, the terminal device may not need to transmit uplink data in the PUR.

In this method, the terminal device preferentially monitors the Paging CSS, so that it can be ensured that the terminal device can detect, in the Paging CSS, paging indication information in time, to receive a paging message in time, thereby reducing a paging delay (paging delay).

Step 703: A network device determines that the PUR collide with the paging common search space.

Step 704: The network device determines to preferentially send, in the paging common search space, the paging indication information used to page the terminal device.

It should be noted that the paging indication information herein may be DCI in an NPDCCH, and the DCI is used to schedule an NPDSCH including a paging message.

In this method, the network device preferentially sends, in the Paging CSS, the paging indication information used to page the terminal device, so that it can be ensured that the terminal device can detect, in the Paging CSS, the paging indication information in time, to receive the paging message in time, thereby reducing the paging delay (paging delay).

In the foregoing method, in a possible implementation, the network device may send first indication information to the terminal device, where the first indication information is used to indicate the terminal device to preferentially monitor the Paging CSS. Therefore, the terminal device may preferentially monitor the Paging CSS based on the first indication information.

Embodiment 3

In the current technology, a terminal device in an idle mode periodically wakes up on a PO to monitor a paging message to check whether there is a paging indication for the terminal device. To further reduce power consumption of the terminal device, a wake-up signal (Wake-up Signal, WUS) is introduced.

When a network device determines that an NPDCCH is to be sent on the PO, the network device sends the WUS prior to the PO. When the network device determines that the NPDCCH does not need to be sent on the PO, the network device does not send any signal prior to the PO, that is, discontinuous transmission (discontinuous transmission, DTX).

Correspondingly, if the terminal device detects the WUS prior to the PO, the terminal device wakes up on the PO to detect the NPDCCH. If the terminal device does not detect the WUS prior to the PO, the terminal device may maintain a sleep mode on the PO, and does not detect the NPDCCH.

Because PUR or PUR SS may also collide with the WUS, an embodiment of this application further provides a method that may be applied to a scenario of the collision between the PUR or the PUR SS and the WUS. Details are described below.

Figure 8:
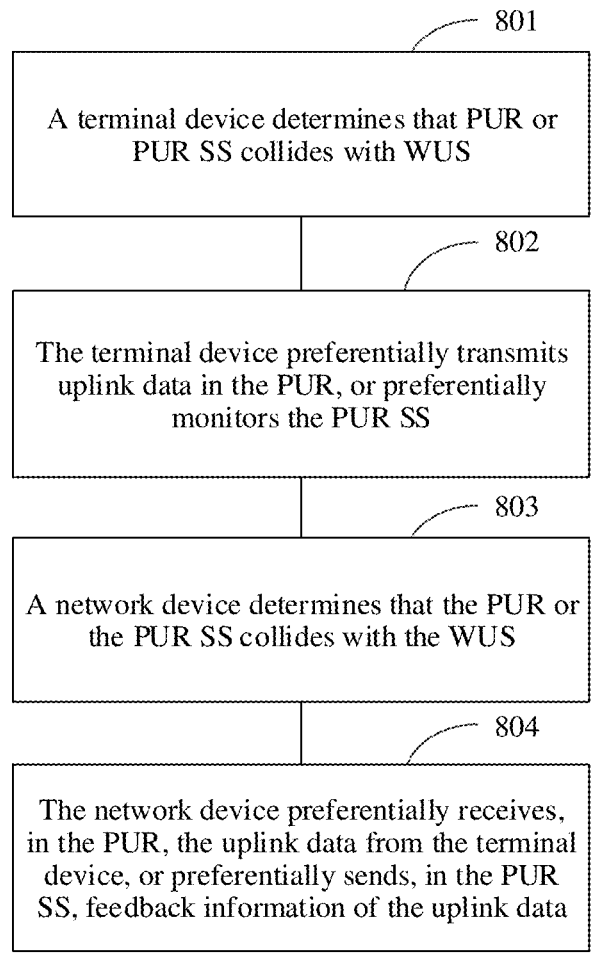
FIG. 8 is a schematic flowchart of a collision handling method according to an embodiment of this application.

FIG. 8 is a schematic flowchart of a collision handling method according to the embodiment of this application. Refer to FIG. 8. The method includes the following steps.

Step 801: The terminal device determines that the PUR or the PUR SS collides with the WUS.

It should be noted that a collision between the PUR and the WUS may mean that the PUR and the WUS overlap in time domain, and a collision between the PUR SS and the WUS may mean that the PUR SS and the WUS overlap in time domain. The overlapping described herein may be partial overlapping or full overlapping.

Further, "a collision between the PUR and the WUS" may also mean that uplink transmission in the PUR collides with the WUS, that is, "NPUSCH transmission on PUR collides with the WUS".

Step 802: The terminal device preferentially transmits uplink data in the PUR, or preferentially monitors the PUR SS.

Specifically, when the PUR collide with the WUS, the terminal device preferentially transmits the uplink data in the PUR. When the PUR SS collides with the WUS, the terminal device preferentially monitors the PUR SS.

It should be noted that when the terminal device preferentially transmits uplink data in the PUR, or preferentially monitors the PUR SS, the terminal device may not need to detect the WUS.

Step 803: The network device determines that the PUR or the PUR SS collides with the WUS.

Step 804: The network device preferentially receives, in the PUR, the uplink data from the terminal device; or preferentially sends, in the PUR SS, feedback information of the uplink data.

In the foregoing method procedure, when the PUR collide with the WUS, the terminal device preferentially transmits the uplink data in the PUR, to avoid a waste of the PUR, thereby improving resource utilization. When the PUR SS collides with the WUS, the terminal device preferentially monitors the PUR SS, to ensure that the terminal device may receive feedback information of the network device for the uplink data in the PUR associated with the PUR SS, thereby improving data transmission efficiency.

In the foregoing method, in a possible implementation, the network device may send second indication information to the terminal device, where the second indication information is used to indicate the terminal device to preferentially transmit the uplink data in the PUR, or to preferentially monitor the PUR SS. Therefore, based on the second indication information, the terminal device preferentially transmits the uplink data in the PUR, or preferentially monitors the PUR SS.

Embodiment 4

With reference to Embodiment 3 provided in this application, in another possible implementation, when the PUR or the PUR SS collides with the WUS, the terminal device may preferentially receive the WUS. Correspondingly, the network device may preferentially send the WUS.

In this implementation, the WUS may be used to reduce the power consumption of the terminal device.

For example, in this implementation, the network device may send third indication information to the terminal device, where the third indication information is used to indicate the terminal device to preferentially receive the WUS. Therefore, the terminal device may preferentially receive the WUS based on the third indication information.

Embodiment 5

With reference to Embodiment 3 provided in this application, in another possible implementation, when the PUR SS collides with the WUS, the terminal device may not use the PUR associated with the PUR SS to transmit the uplink data.

This method is simple and flexible to implement, and may further avoid the collision between the PUR SS and the WUS.

In the foregoing embodiments provided in this application, the method provided in the embodiments of this application is separately described from a perspective of interaction between devices. To implement functions in the foregoing methods provided in the embodiments of this application, the terminal device and the network device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 9:
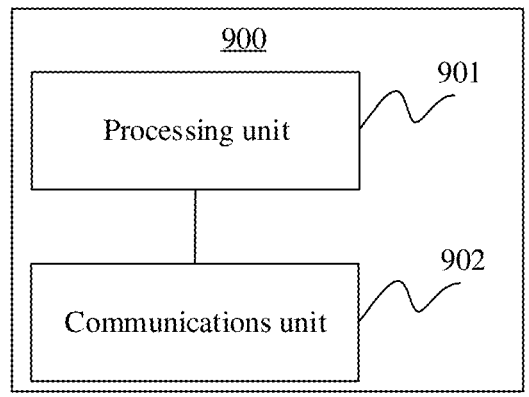
FIG. 9 is a schematic diagram of a structure of a communications apparatus according to an embodiment of this application.

Same as the foregoing concept, as shown in FIG. 9, an embodiment of this application further provides an apparatus 900, configured to implement a function of the terminal device or the network device in the foregoing methods. For example, the apparatus may be a software module or a chip system. In this embodiment of this application, the chip system may include a chip, or may include a chip and another discrete component. The apparatus 900 may include a processing unit 901 and a communications unit 902.

In this embodiment of this application, module division is an example, and is merely logical function division. There may be another division manner in actual implementation. In addition, functional modules in the embodiments of this application may be integrated into one processor, or each of the modules may exist alone physically, or two or more modules are integrated into one module. The integrated module may be implemented in a form of hardware, or may be implemented in a form of a software function module.

For example, when the apparatus 900 implements a function of the terminal device in the procedure shown in FIG. 4,
the processing unit 901 is configured to determine that preconfigured uplink resources search space PUR SS collides with paging common search space Paging CSS; and
the communications unit 902 is configured to determine, based on a status of uplink data transmission in PUR associated with the PUR SS and/or a discontinuous reception DRX configuration status of the terminal device, to preferentially monitor the PUR SS or to preferentially monitor the Paging CSS.

In a possible design, the communications unit 902 is specifically configured to:
preferentially monitor the PUR SS when the terminal device has performed uplink data transmission in the PUR and the terminal device is a discontinuous reception DRX terminal device.

In a possible design, the communications unit 902 is specifically configured to:
preferentially monitor the Paging CS S when the terminal device does not perform uplink data transmission in the PUR, or when the terminal device has performed uplink data transmission in the PUR and the terminal device is an extended discontinuous reception eDRX terminal device.

For example, when the apparatus 900 implements a function of the network device in the procedure shown in FIG. 4,
the processing unit 901 is configured to determine that the preconfigured uplink resources search space PUR SS collides with the paging common search space Paging CSS; and
the communications unit 902 is configured to determine, based on the status of uplink data transmission in the PUR associated with the PUR SS and/or the discontinuous reception DRX configuration status of the terminal device, to preferentially send, in the PUR SS, feedback information of uplink data, or to preferentially send, in the Paging CSS, paging indication information used to page the terminal device.

For example, when the apparatus 900 implements a function of the terminal device in the procedure shown in FIG. 7,
the processing unit 901 is configured to determine that preconfigured uplink resources PUR collide with paging common search space Paging CSS; and
the communications unit 902 is configured to preferentially monitor the Paging CSS.

In a possible design, the communications unit 902 is further configured to:
receive first indication information from a network device, where the first indication information is used to indicate the terminal device to preferentially monitor the Paging CSS.

For example, when the apparatus 900 implements a function of the network device in the procedure shown in FIG. 7,
the processing unit 901 is configured to determine that the preconfigured uplink resources PUR collide with the paging common search space Paging CSS; and
the communications unit 902 is configured to determine to preferentially send, in the Paging CSS, paging indication information used to page the terminal device.

For example, when the apparatus 900 implements a function of the terminal device in the procedure shown in FIG. 8,
the processing unit 901 is configured to determine that preconfigured uplink resources PUR or preconfigured uplink resources search space PUR SS collides with a WUS; and
the communications unit 902 is configured to preferentially transmit uplink data in the PUR, or preferentially monitor the PUR SS.

In a possible design, the communications unit 902 is further configured to:

receive second indication information from a network device, where the second indication information is used to indicate the terminal device to preferentially transmit the uplink data in the PUR, or preferentially monitor the PUR SS.

For example, when the apparatus 900 implements a function of the network device in the procedure shown in FIG. 8, the processing unit 901 is configured to determine that the preconfigured uplink resources PUR or the preconfigured uplink resources search space PUR SS collides with the WUS; and the communications unit 902 is configured to preferentially receive, in the PUR, the uplink data from the terminal device; or preferentially send, in the PUR SS, feedback information of the uplink data.

Figure 10:
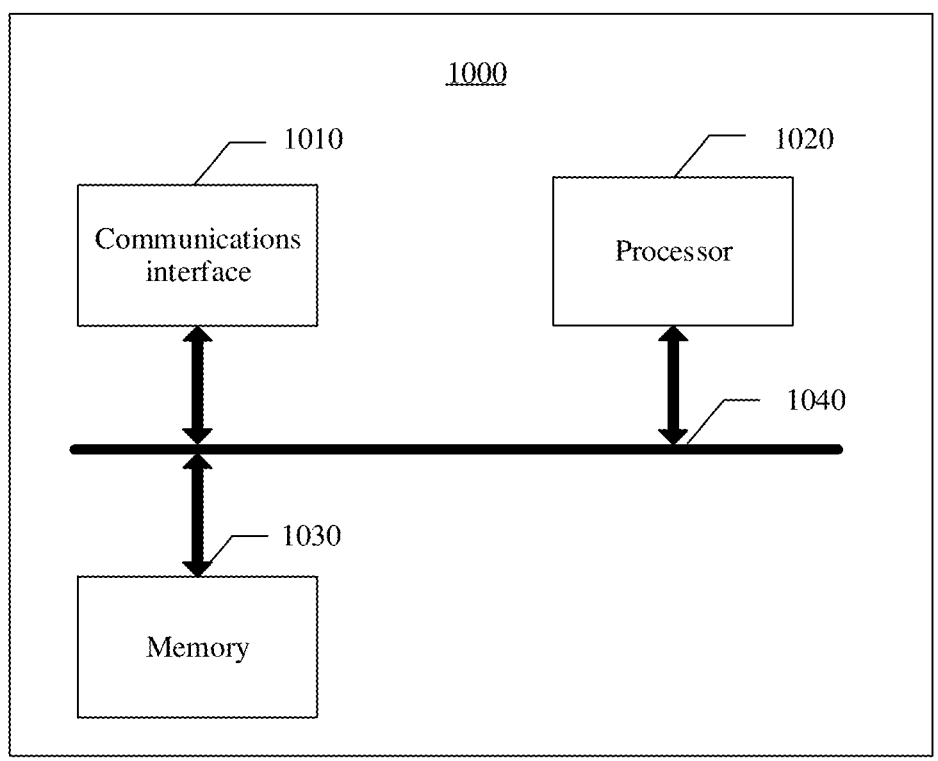
FIG. 10 is a schematic diagram of a structure of a communications apparatus according to an embodiment of this application.

FIG. 10 shows an apparatus 1000 according to an embodiment of this application. The apparatus shown in FIG. 10 may be an implementation of a hardware circuit of the apparatus shown in FIG. 9. The communications apparatus is applicable to the flowcharts shown in FIG. 4 to FIG. 8, and performs the function of the terminal device or the network device in the foregoing method embodiments. For ease of description, FIG. 10 shows only main components of the communications apparatus.

The apparatus 1000 shown in FIG. 10 includes at least one processor 1020, configured to implement any method in FIG. 4 to FIG. 8 provided in the embodiments of this application.

The apparatus 1000 may further include at least one memory 1030, configured to store program instructions and/or data. The memory 1030 is coupled to the processor 1020. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may operate in collaboration with the memory 1030. The processor 1020 may execute the program instructions stored in the memory 1030. At least one of the at least one memory may be included in the processor.

The apparatus 1000 may further include a communications interface 1010, configured to communicate with another device through a transmission medium, so that an apparatus in the apparatus 1000 can communicate with the another device. In this embodiment of this application, the communications interface may be a transceiver, a circuit, a bus, a module, or a communications interface of another type. In this embodiment of this application, the transceiver may be an independent receiver, an independent transmitter, a transceiver with an integrated receiving and transmitting function, or an interface circuit. The processor 1020 receives and transmits data by using the communications interface 1010, and is configured to implement the methods performed by the terminal device or the network device in the embodiments corresponding to FIG. 4 to FIG. 8. For details, refer to the foregoing descriptions. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clear that, a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A collision handling method, comprising:
   determining, by a terminal device, that preconfigured uplink resources (PUR) or a preconfigured uplink resources search space (PUR SS) collides with a Wake-up signal (WUS);
   in response to the determining the PUR collides with the WUS, transmitting, by the terminal device, uplink data in the PUR by prioritizing transmission of the uplink data in the PUR over detecting the WUS; and
   in response to the determining the PUR SS collides with the WUS, monitoring, by the terminal device, the PUR SS by prioritizing monitoring the PUR SS over detecting the WUS.

2. The method according to claim 1, wherein the method further comprises:
   receiving, by the terminal device, indication information from a network device, wherein the indication information indicates that the terminal device is to:
   transmit the uplink data in the PUR and monitor or not monitor the PUR SS; or
   monitor the PUR SS and transmit or not transmit the uplink data in the PUR.

3. A collision handling method, comprising:
   determining, by a network device, that preconfigured uplink resources (PUR) collide with a Wake-up signal (WUS);
   in response to determining that the PUR collide with the WUS, prioritizing receiving, by the network device in the PUR, uplink data from a terminal device; and sending, by the network device, feedback information of the uplink data to the terminal device in a preconfigured uplink resources search space (PUR SS) being monitored by the terminal device, the PUR SS being prioritized to be monitored by the terminal device over detecting the WUS in response to the terminal device determining the WUS collides with the PUR SS.

4. The method according to claim 3, wherein the method further comprises:
sending, by the network device, indication information to the terminal device, wherein the indication information indicates that the terminal device is to:
transmit the uplink data in the PUR and to monitor or not monitor the PUR SS; or
monitor the PUR SS and transmit or not transmit the uplink data in the PUR.

5. A collision handling apparatus, comprising:
at least one processor, and
one or more memories coupled to the at least one processor and storing programming instructions for execution by the at least one processor to:
determine that preconfigured uplink resources (PUR) or preconfigured uplink resources search space (PUR SS) collides with a Wake-up signal (WUS);
in response to the PUR being determined to collide with the WUS, transmit uplink data in the PUR by prioritizing transmission of the uplink data in the PUR over detecting the WUS; and
in response to the PUR SS being determined to collide with the WUS, monitor the PUR SS by prioritizing monitoring of the PUR SS over detecting the WUS.

6. The apparatus according to claim 5, wherein the one or more memories store programming instructions for execution by the at least one processor to:
receive indication information from a network device, wherein the indication information indicates the apparatus to:
transmit the uplink data in the PUR and monitor or not monitor the PUR SS; or
monitor the PUR SS and transmit or not transmit the uplink data in the PUR.

7. A collision handling apparatus, comprising:
at least one processor, and
one or more memories coupled to the at least one processor and storing programming instructions for execution by the at least one processor to:
determine that preconfigured uplink resources (PUR) collide with a Wake-up signal (WUS);
in response to the PUR being determined to collide with the WUS, prioritize receiving uplink data in the PUR from a terminal device; and
send feedback information of the uplink data to the terminal device in a preconfigured uplink resources search space (PUR SS) being monitored by the terminal device, the PUR SS being prioritized to be monitored by the terminal device over detecting the WUS in response to the terminal device determining the WUS collides with the PUR SS.

8. The apparatus according to claim 7, wherein the one or more memories store programming instructions for execution by the at least one processor to:
send indication information to the terminal device, wherein the indication information indicates that the terminal device is to:
transmit the uplink data in the PUR and to monitor or not monitor the PUR SS; or
monitor the PUR SS and transmit or not transmit the uplink data in the PUR.

9. The method according to claim 1, further comprising:
receiving, by the terminal device, indication information from a network device, wherein the indication information indicates that the terminal device is to receive the WUS.

10. The method according to claim 9, further comprising:
receiving a narrowband physical downlink control channel (NPDCCH) on a paging occasion (PO).

11. The method according to claim 3, further comprising:
sending, by the network, indication information to the terminal device, wherein the indication information indicates that the terminal device is to receive the WUS.

12. The method according to claim 11, further comprising:
sending, by the network device, a narrowband physical downlink control channel (NPDCCH) on a paging occasion (PO).

13. The apparatus according to claim 5, wherein the one or more memories store programming instructions for execution by the at least one processor to:
receive indication information from a network device, wherein the indication information is usable to indicate the apparatus is to receive the WUS.

14. The apparatus according to claim 13, wherein the one or more memories store programming instructions for execution by the at least one processor to:
receive a narrowband physical downlink control channel (NPDCCH) from a network device on a paging occasion (PO).

15. The apparatus according to claim 7, wherein the one or more memories store programming instructions for execution by the at least one processor to:
send indication information to the terminal device, wherein the indication information is usable to indicate to the terminal device to receive the WUS.

16. The apparatus according to claim 15, wherein the one or more memories store programming instructions for execution by the at least one processor to:
send a narrowband physical downlink control channel (NPDCCH) to the terminal device on a paging occasion (PO).

* * * * *